United States Patent Office 3,376,503
Patented Apr. 2, 1968

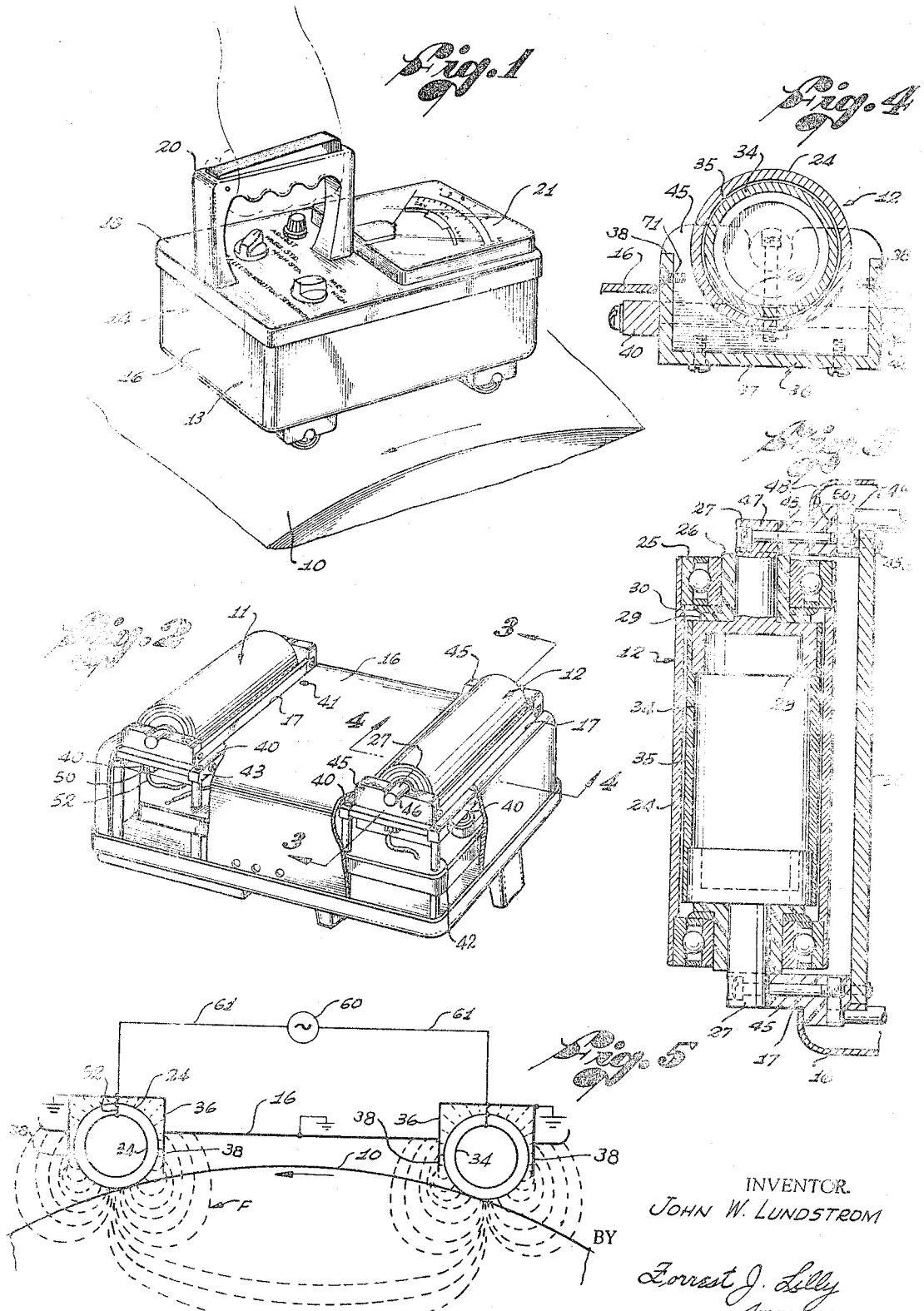

3,376,503
ROLLER ELECTRODE PROBE WITH CAPACITOR SHROUD FOR ELECTRICAL MOISTURE TESTING INSTRUMENT
John W. Lundstrom, Glendora, Calif., assignor to Moisture Register Company, Alhambra, Calif., a corporation of California
Filed June 1, 1965, Ser. No. 460,190
5 Claims. (Cl. 324—61)

ABSTRACT OF THE DISCLOSURE

An electrically grounded shroud disposed about a roller electrode adapted for application to a rotating roll of paper or the like, whose moisture content is to be determined, the roller electrode and shroud being electrically connected to the output terminals of an oscillator, whereby an electric field is created between the electrode roller and shroud. This field penetrates into the paper roll, and the shroud is formed and located to produce a relatively shallow depth of penetration.

This invention relates generally to electrical moisture meters and, more particularly, to a novel and improved roller-type probe for a moisture measurement meter for determining the moisture content in, for example, a roll of paper being wound up from a traveling web.

There is now known an instrument of this type utilizing a probe in the form of two parallel rollers which engage the periphery of a rotating roll of paper and which project a high frequency field into the roll of paper, the rollers being the output electrodes of a high frequency oscillator, usually operating in the megacycle range, see Patent No. 3,046,479. The two rollers may act as the two elements of an electrical capacitor, being spaced apart from one another to permit a high frequency electric field to etxend therebetween. This field penetrates such a substance as a roll of paper to a certain depth when the roller electrodes are held against the surface of the latter, and the effect of any contained moisture in the paper is to influence the electric field formed between the electrodes and, in turn, the electrical state within the oscillator itself such as may be read by a suitable indicating meter. The rollers turn freely with the rotating roll of paper, permitting the electrodes to be held against the rapidly traveling peripheral surface of the roll without vibration or jumping, and thus permitting the taking of readings notwithstanding the motion of the roll.

It is sometimes highly desirable that the electric field not penetrate too deeply into the roll of paper, so that readings can be taken with only a relatively small amount of paper wound onto the roll, and a primary object of the present invention is a provision of an instrument of the foregoing character whose depth of electric field penetration into the roll of paper is greatly curtailed.

The present invention is illustratively here shown as applied to a roller electrode of an improved type, which, per se, was not my invention. This improved roller probe substitutes for an electrode roller of the older type a pair of concentric cylinders, the outer of which is rotatable and engageable with the rotating roll of paper, while the inside cylinder is stationarily mounted. The two cylinders are spaced by an air gap and are insulated from one another throughout, so as to act as a coupling capacitor. The outside cylinder is insulated from the instrument case, and electrical connection from the oscillator is made through fixed mechanical parts to each stationary inside cylinder. The outside cylinder is thus energized through the air gap between cylinders from the inside cylinder. An electric field pattern then extends from each electrode roller to grounded portions of the adjacent case, and/or to the other roller. This field penetrates the roll of paper on test, and permits readings of moisture content to be taken.

The present invention provides the roller probe, with an electrically grounded shroud, which establishes a short path of high voltage gradient, from the roller to ground, for the electric field, the shroud being so located as to concentrate the field in a region which avoids substantial depths into the paper.

The invention will be further described in a present illustrative form with reference to the accompanying drawings, wherein:

FIG. 1 is a perspective view of a present illustrative embodiment of the invention applied to a rotating roll of paper;

FIG. 2 is a perspective view of the underside of the instrument seen in FIG. 1;

FIG. 3 is a section taken on line 3—3 of FIG. 2;

FIG. 4 is a section taken on line 4—4 of FIG. 2; and

FIG. 5 is a diagrammatic view showing schematically the electric energizing circuit and the operative portions of the invention.

In the drawings, numeral 10 designates fragmentarily a large roll of paper, which is being rolled up from a traveling web, the arrow in FIG. 1 designating the motion of the paper. Applied against the cylindrical periphery of this roll of paper 10, as seen in FIG. 1, are the two roller electrode probes 11 and 12 of a portable, hand-held moisture measurement instrument 13. The latter has an exterior housing generally designated by numeral 14 and comprising a top 15 and a removable case 16 which may be held in place by suitable screws, as later mentioned. The case 16 has two spaced and parallel, rectangular apertures 17 in its bottom through which project the major portion of the roller electrodes 11 and 12, together with a portion of the mounting means therefor, as presently to be described in more detail. The top 15 is provided with a handle 20, an indicating meter 21 and necessary controls as suggested in FIG. 1. The roller electrode probes 11 and 12 are identical, and the description of the probe 12, shown in longitudinal and transverse section in FIGS. 3 and 4, respectively, will suffice for both.

The roller probe 12 comprises an exterior cylinder 24 of electrically conductive material, and this cylinder may be of such electrically conductive materials as stainless steel or aluminum. Preferably, it is composed of aluminum which is anodized on its outer surface for hardening purposes, so as to resist wear. The anodizing coating is of insulation character but does not interfere with the desired electrical performance. This coating is of the order of approximately a thousandth of an inch in thickness, and the surface thus formed on the roller is of substantially zero impedance to the megacycle range oscillating currents with which the instrument is energized. The voltage drop across the coating is insignificant. In a typical example, the cylinder 24 is 3.656 inches in length and 1.460 inches in diameter. The rollers 11 and 12 are spaced well apart so as to span a good arc of the cylindric roll of paper, in the proportions approximately as shown. The cylinder 24 is mounted at opposite ends on roller bearings 25, the inner race rings of which are fitted onto insulation bushings 26 which, in turn, surround stub shafts 27 which project entirely through the bushings 26 and the bearings 25. One the inner end of each stub shaft 27 is a radially enlarged, cup-shaped, shaft-end part 28, and the bushing 26 has a radial flange 29 between the cup-shaped part 28 and the bearing 25 serving to electrically insulate the bearing 25 from the member 28. A sealing washer 30 is also placed between the insulation flange 29 and the inner race ring of the bearing.

Mounted on the two radially enlarged shaft end parts 28 is an electrically conductive cylindrical shell 34, composed typically of aluminum, or stainless steel, whose outer peripheral surface is spaced by a narrow, annular or cylindrical gap 35, typically of a dimension of .010", from the inside peripheral surface of the exterior cylindrical roller 24. The roller cylinder 24 and the cylindrical shell 34, being thus separated and insulated from one another, for an electrical coupling capacitor, having in this instance a typical capacitance of 230 mmf.

Each roller assembly as thus described is received partially within an electrically conductive channel member or shroud 36. This channel member, in the design here shown, is generally rectangular in cross-section, having a bottom member 37 and two side flanges 38. The spacing of the side flanges 38 is such as indicated best in FIG. 4 and is designed to cooperate in the establishment of a desirable electric field pattern as to be referred to in more particular hereinafter. It will be seen that the upper edges of the flanges 38 are, in the present design, just below the center axis of the roller probe. Secured to the side flanges 38 are electrically conductive rails 40, composed preferably of aluminum, which underlie and support the removable case 16, and the case 16 may be secured in place by screws threading into these rails, such as indicated at 41. The rails 40 are, in turn, mounted on the upper ends of frame rods 42, composed of electrically conductive material, and understood to be electrically grounded to the frame parts and housing of the instrument. Thus the electrically conductive channel 36 is electrically connected to the rails 40, which are, in turn, fastened, as by screws 43, to the electrically grounded frame rods 42. The channels 36, the rails 40, the frame rods 42, and the case 16 will be seen to be all electrically grounded, the case 16 being, of course, electrically connected to the rails 40 by resting thereon and by means of the screws 41.

At the ends of each channel 36 are insulation end walls 45, fastened to the channels by screws 45a (FIG. 3), and each of these end walls is centrally notched at 46 to receive the extremities of the aforementioned stub shafts 27. The extremities of stub shafts 27, within the region of the notches 46 in end walls 45, are drilled to receive long screws 47 which reach through the end walls 45 to slots 48 accommodating nuts 49 into which the screws are threaded and set tight. The nuts 49 have projecting lugs 50, and electrical connection is made to the inner cylinder 34 by soldering to one lug 50 for each of the rollers 11 and 12 an electrical lead 52 (FIG. 2). It will be understood that the screws 47 and nuts 49 with their electrical connector lugs 50 are insulated from the grounded frame and housing structure of the instrument. The circuit is continued to the cylinder 34 via the screw 47, the shaft member 27, and the part 28.

Reference is next directed to FIG. 5, showing the instrument diagrammatically, and showing also, in simple diagram, the oscillator circuit by which the system is energized. A high frequency oscillator 60 (usually in the megacycle range) is contained in the instrument, and has its two output leads connected via circuit leads 61 and the aforementioned electrical connections 52 to the inside electrode cylinders 34. The two electrode cylinders 34 are thus always at opposite potentials relative to ground; and from what has been said above, it will be understood that the channels 36 and the instrument case 16 are at ground potential, as designated in FIG. 5. The electrically conductive rollers 24 separated by the small gap 35 from the energized cylinders 34, being capacitively coupled to the cylinders 34, are thus energized to opposite potentials relative to ground, and the return path from the two energized electrode rollers 24 is thus by way of electric paths to grounded portions of the instrument. The electric field, here designated by the letter F, extends from the rollers 24 largely to the grounded shrouds or channels 36, with a substantial portion of it looping first through the roll of paper 10, as suggested by the electric field line pattern in FIG. 5. As will be seen by the diagram, a few field lines extend from one roller 24 to the other through the paper, and these may penetrate somewhat deeply into the paper. These particular field lines may not be particularly desired, especially where relatively shallow penetration is sought, but they cannot be completely avoided and are not bothersome to any material extent. The field lines of primary usefulness are those that extend from the roller 24 into the paper and then loop back to the channel 36 or to the immediately adjacent portions of casing 16, as roughly represented in FIG. 5. It will be seen that the grounded channel members in close proximity to the rollers provide field paths of relatively high voltage gradient to ground, and thus concentrate the field in the paths from the rollers to the channels, with the effect of weakening it at substantial depths into the paper.

The oscillator 60 may be of either of two types, first, one whose interior state is substantially influenced by the varying dielectric constant of a media within an electric field in its output circuit, and, second, one whose interior state is substantially influenced by power absorption from the oscillator by media within an electric field in its output circuit. An example of the first type of instrument is given in Patent No. 3,046,479 issued July 24, 1962, to Mead and McBrayer for "Moisture Content Meter." A power absorption type of oscillator is disclosed in a representative form in Patent No. 2,231,035 issued Feb. 11, 1941, to Stephens and Dallas for "Power Absorption Metering System." In each case, the electrical indicating instrument 21 is in or across a measurement circuit within the oscillator and provides a reading which varies materially with the moisture present in the paper. Thus, in the first case, the percentage of moisture in the portion of the paper roll 10 penetrated by the electric field has an effect on the dielectric constant of that portion of the paper, and this moisture content percentage can be read directly from the calibrated instrument 21. Similarly, in the second case, the percentage of moisture in the portion of the paper penetrated by the output field of the oscillator determines the power absorption from the oscillator circuit, and this power output can be read at the meter 21, calibrated in terms of percentage of moisture content.

It will be seen that the electrical energizing circuit utilized in the present invention involves a floating oscillator connected through two electric field output regions to ground, each region penetrating the paper, so as to sample the moisture content therewithin. It will be seen that while two rollers are preferably used, each energized as described above, it is also possible to utilize a single energized roller. Such change would involve merely the disconnection of one side of the oscillator 60 from the corresponding roller, and the connection of this side of the oscillator directly to ground. The instrument can be operated in this fashion, using the de-energized roller simply as an idler or stabilizer against the rotating roll of paper. Or, in some simple applications, it may be feasible, where paper roll speed is not too great, or where the roll of paper is not actually in rotation, to omit the disconnected roller entirely.

The invention has been described in one present illustrative form, but it will be understood that various changes in design, structure and arrangement may be made without departing from the spirit and scope of the appended claims.

I claim:

1. An electrical capacitor roller probe for an electrical moisture meter for testing moisture content in a rotating roll of paper or the like, comprising:

an electrically conductive support at ground potential, a pair of parallel, electrically conductive rollers spaced from one another and mounted on said support with corresponding outer sides thereof unobstructed by said support for spanning application to the periphery of a roll of paper or the like, means rotatably mounting said rollers on said support and insulating said rollers therefrom, a moisture register oscillator circuit having terminals delivering signals of equal amplitude but opposite polarity electrically coupled one to each of said rollers, and electrically conductive field shaping means electrically grounded to said support located in proximity to and laterally of each of said rollers, in such a manner as to concentrate the electric field in paths to said shaping means and thereby divert it from deep penetration into the roll of paper.

2. The subject matter of claim 1, wherein the field shaping means for each of said rollers comprises a pair of electrically conductive oppositely facing wall members spaced on opposite sides of said roller and positioned to be spaced from the periphery of a roll of paper to which said rollers may be applied.

3. The subject matter of claim 1, wherein the field shaping means for each of said rollers comprises an electrically grounded channel member receiving, with spacing, a substantial portion of the associated roller opposite the paper-roll-engaging side of said roller.

4. An electrical capacitor roller probe for an electrical moisture meter for testing moisture content in a rotating roll of paper or the like, comprising:

a support, an electrically conductive cylindrical electrode roller rotatably mounted on said support with one side thereof unobstructed by said support for application to the periphery of a roll of paper or the like whose moisture content is to be tested, a moisture measurement oscillator circuit electrically coupled at one side to said roller, and electrically conductive field-shaping shroud means mounted on said support to be in spaced relation from the periphery of a roll of paper to which said roller has been applied, said shroud means including a pair of oppositely facing electrically conductive wall members spaced on opposite sides of said rollers, at relatively close spacing thereto, and facing theretoward, said roller having a paper-roll-engageable peripheral portion which projects from and beyond the space between said plates, so as to afford clearance between said plates and paper roll when said roller is in engagement with said roll, said plates electrically coupled to the opposite side of said oscillator, in such manner that a concentrated electric field extends between said roller and said plates, a stray portion of which passes through a paper roll engaged by said roller, with depth of penetration into the roll limited by the field concentrating effect of said plates.

5. The subject matter of claim 4, wherein said field shaping means comprises an electrically conductive channel member having side walls comprised of said plates and receiving, with spacing, a substantial portion of said roller opposite the paper-roll-engaging side of said roller.

References Cited

UNITED STATES PATENTS

| | | | |
|---|---|---|---|
| 2,428,700 | 10/1947 | Eilenberger | 324—61 |
| 2,573,824 | 11/1951 | Baker | 324—61 |
| 2,718,620 | 9/1955 | Howe | 324—61 X |
| 2,782,367 | 2/1957 | Dallas | 324—61 |
| 2,950,436 | 11/1960 | Butticaz et al. | 324—61 |
| 2,992,392 | 7/1961 | Haynes | 324—61 |
| 3,046,479 | 7/1962 | Mead at al. | 342—61 |
| 3,284,706 | 11/1966 | Benson | 324—61 |

FOREIGN PATENTS

| | | |
|---|---|---|
| 673,684 | 11/1963 | Canada. |
| 580,282 | 7/1958 | Italy. |

RUDOLPH V. ROLINEC, *Primary Examiner.*

E. E. KUBASIEWICZ, *Assistant Examiner.*